Patented Jan. 19, 1932

1,842,293

UNITED STATES PATENT OFFICE

HORACE A. SHONLE, OF INDIANAPOLIS, INDIANA, ASSIGNOR TO ELI LILLY AND COMPANY, OF INDIANAPOLIS, INDIANA, A CORPORATION OF INDIANA

SUBSTITUTED MALONIC ESTER

No Drawing.   Application filed May 2, 1931. Serial No. 534,692.

It is the object of my invention to produce certain di-substituted malonic esters that are useful as intermediates in the preparation of other products, notably in the preparation of di-aliphatic-substituted barbituric acids and salts of those acids.

The particular malonic esters to which the present application relates are the methyl-, ethyl-, and propyl-malonates, of which I prefer for convenience the ethyl-malonate; and in which one of the methylene-hydrogen atoms is replaced by a saturated secondary-aliphatic radical, open-chain or cyclic, having from five to seven carbon atoms inclusive, including the following groups:

Secondary-amyl,      Cyclo-pentyl,
Secondary-hexyl,     Cyclo-hexyl, and
Secondary-heptyl,    Cyclo-heptyl.

Some of the substituent groups in the preceding list include various isomers under the same general name; as, for example, the secondary-amyl group includes the n-propyl-methly-carbinyl, di-ethyl-carbinyl, and iso-propyl-methyl-carbinyl radicals. All of the substituted malonic esters of the present application include a substituent group as above identified. The di-substituted malonic esters to which the present application is directed also include as a second substituent, substituted for the other methylene-hydrogen atom, a straight-chain aliphatic radical having five hydrogen atoms and no triple bonds, comprising the ethyl group and the allyl group.

These new esters may all be represented by the following formula:

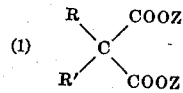

in which R represents a saturated secondary-aliphatic radical, open-chain or cyclic, having from five to seven carbon atoms inclusive; R' represents a straight-chain aliphatic radical having five hydrogen atoms and no triple bonds, and so either the ethyl group or the allyl group; and Z represents an alkyl radical having not to exceed three carbon atoms, namely the methyl, ethyl, and propyl radicals.

The present application is in part a continuation of my co-pending application Serial No. 387,084, filed August 19, 1929; in which co-pending application there are some claims broad enough to cover generically some or all of these esters, although most of the claims of such co-pending application are directed specifically to salts of barbituric acids.

Since I prefer the ethyl-malonate as the starting compound, as has been stated above, rather than the propyl- or the methyl-malonate, I have used it in the following examples; although of course the methyl-malonate or the propyl-malonate may be used instead.

These di-aliphatic-substituted malonic esters are prepared by refluxing slightly in excess of one mole of the desired secondary-aliphatic halide (conveniently the bromide) with one mole of sodium ethyl ethyl-malonate or sodium allyl ethyl-malonate (or of the corresponding propyl-malonate or methyl-malonate) in absolute alcohol, desirably until the reaction is substantially complete or until the reaction mixture is no longer alkaline, removing the alcohol as by distillation, washing the sodium halide from the residual ester with water, drying, and purifying the ester by fractional distillation preferably in vacuo.

It is necessary to introduce the ethyl or allyl substituent first into the ethyl-malonate, (or into the propyl- or methyl-malonate,) to make a mono-substituted ethyl-malonate, since it has not been found possible by the above method to introduce a substantial amount of the ethyl group or of the allyl group into a mono-substituted ethyl-malonate containing a secondary-aliphatic substituent.

These di-substituted esters may be used for preparing barbituric acids by the methods set forth in my aforesaid co-pending application Serial No. 387,084.

I now give several examples of these di-aliphatic substituted malonic esters:

A. *Secondary-amyl ethyl malonic esters*

1. n-Propyl-methyl-carbinyl ethyl ethylmalonate, (also called ethyl 1-methyl-butyl ethyl-malonate,) may be prepared as follows: 1 mole of sodium is dissolved in 10 or 12 times its weight of absolute alcohol under a reflux condenser. 1 mole of ethyl ethyl-malonate is added, and then 1.1 moles of 2-bromo-pentane (obtained by refluxing n-propyl-methyl-carbinol with HBr) are added gradually. The mixture is refluxed for some hours, or until it no longer shows an alkaline reaction to moist litmus paper. Most of the alcohol is removed by vacuum distillation, leaving an oily residue. Water is added to this residue to dissolve out the sodium bromide; and the oily layer, which is n-propyl-methyl-carbinyl ethyl ethyl-malonate, is separated and dried. It is purified by fractional distillation in vacuo. When so purified, n-propyl-methyl-carbinyl ethyl ethyl-malonate is a colorless or pale yellow liquid, having a boiling point of 110–112.5° C. at about 4 mm. pressure, and a refractive index at 25° C. of about 1.4326 to 1.4343. It may be represented by the following formula:

(2) 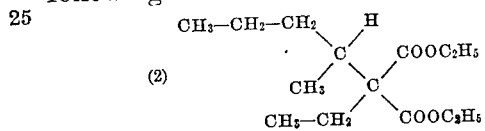

2. Di-ethyl-carbinyl ethyl ethyl-malonate is prepared analogously to n-propyl-methyl-carbinyl ethyl ethyl-malonate, using 3-bromo-pentane (obtained by refluxing di-ethyl-carbinol with HBr). It is a colorless or pale yellow liquid, having when purified by fractional distillation in vacuo a boiling point of 110–112.5° C. at about 4 mm. pressure, and a refractive index at 25° C. of about 1.4325 to 1.4345. It may be represented by the following formula:

(3) 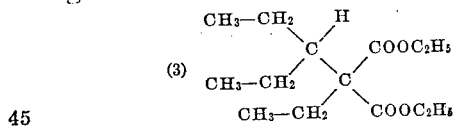

3. Cyclo-pentyl ethyl ethyl-malonate is prepared analogously to n-propyl-methyl-carbinyl ethyl ethyl-malonate, using cyclo-pentyl bromide (obtained by refluxing cyclo-pentanol with HBr). It is a colorless or pale yellow liquid, having when purified by fractional distillation in vacuo a boiling point of 123–124° C. at about 5 mm. pressure, and a refractive index at 25° C. of about 1.4489 to 1.4498. It may be represented by the following formula:

(4) 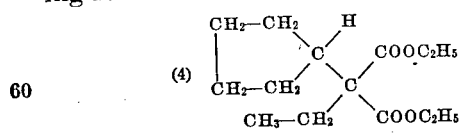

B. *Secondary-hexyl ethyl malonic esters*

1. n-butyl-methyl-carbinyl ethyl ethyl-malonate is an example of secondary-hexyl ethyl malonic esters. It is prepared analogously to n-propyl-methyl-carbinyl ethyl ethyl-malonate, using 2-bromo-hexane (obtained by refluxing n-butyl-methyl-carbinol with HBr). It is a colorless or pale yellow liquid, having when purified by fractional distillation in vacuo a boiling point of 120–128° C. at about 5½ mm. pressure, and a refractive index at 25° C. of about 1.4332 to 1.4366. It may be represented by the following formula:

(5) 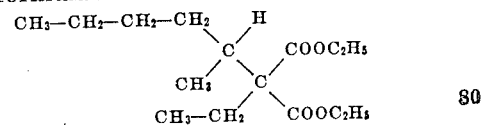

C. *Secondary-heptyl ethyl malonic esters*

1. Di-n-propyl-carbinyl ethyl ethyl-malonate is an example of secondary-heptyl ethyl malonic esters. It is prepared analogously to n-propyl-methyl-carbinyl ethyl ethyl-malonate, using 4-bromo-heptane (obtained by refluxing di-n-propyl-carbinol with HBr). It is a colorless or pale yellow liquid, having when purified by fractional distillation in vacuo a boiling point of 127–133° C. at about 10 mm. pressure, and may be represented by the following formula:

(6) 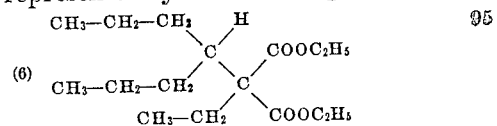

D. *Secondary-aliphatic allyl malonic esters*

1. n-propyl-methyl-carbinyl allyl ethyl-malonate is an example of these. It may be prepared as follows: 1 mole of sodium is dissolved in 10 or 12 times its weight of absolute alcohol under a reflux condenser. 1 mole of allyl ethyl-malonate is added, and then 1.05 moles of 2-bromo-pentane are added gradually. The mixture is refluxed for some hours, or until it no longer shows an alkaline reaction to moist litmus paper. Most of the alcohol is removed by vacuum distillation, leaving an oily residue. Water is added to this residue to dissolve out the sodium bromide; and the oily layer, which is n-propyl-methyl-carbinyl allyl ethyl-malonate, is separated and dried. It is purified by fractional distillation in vacuo. When so purified, n-propyl-methyl-carbinyl allyl ethyl-malonate is a colorless or pale yellow liquid, having a boiling point of about 95° C. at approximately 1 mm. pressure, and a refractive index at 20° C. of approximately 1.4430. It may be represented by the following formula:

(7) 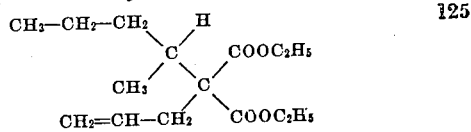

2. Various other secondary-aliphatic allyl malonic esters may be made in the manners above described for the secondary-aliphatic ethyl malonic esters, under sub-heads A, B, and C of the di-aliphatic-substituted malonic esters. The fundamental difference in the preparation is merely that instead of adding ethyl ethyl-malonate as described in those processes, allyl ethyl-malonate is added.

Allyl ethyl-malonate may be prepared as follows: 1 mole of sodium is dissolved in 10 to 12 times its weight of absolute alcohol under a reflux condenser. To this are added 1 mole of ethyl-malonate, and then gradually 1.1 moles of allyl bromide. The mixture is refluxed gently for some hours, or until it no longer shows an alkaline reaction to moist litmus paper. Most of the alcohol is removed by vacuum distillation, leaving an oily residue. Water is added to this residue to dissolve the sodium bromide; and the oily layer, which is allyl ethyl-malonate, is separated and dried. It may be purified by fractional distillation in vacuo. When thus purified, allyl-ethyl-malonate is a colorless or pale yellow liquid having a boiling point of about 114° to 118° C at about 17 mm. pressure, and a refractive index at 20° C. of about 1.4280 to 1.4310. It may be represented by the following formula:

(8) 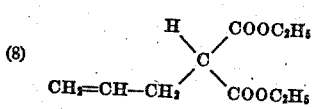

I claim as my invention:

1. A di-substituted malonic ester in which one of the methylene-hydrogen atoms is replaced by a saturated secondary-aliphatic radical having a number of carbon atoms between 5 and 7 inclusive and in which the other methylene-hydrogen atom is replaced by a straight-chain aliphatic radical having 5 hydrogen atoms and no triple bonds.

2. A di-substituted malonic ester represented by the following formula:

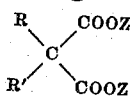

in which R is a saturated secondary-aliphatic radical having a number of carbon atoms between 5 and 7 inclusive, R' is a straight-chain aliphatic radical having 5 hydrogen atoms and no triple bonds, and Z is an alkyl group having not to exceed 3 carbon atoms.

3. A di-substituted malonic ester represented by the following formula:

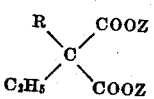

in which R is a saturated secondary-aliphatic radical having a number of carbon atoms between 5 and 7 inclusive, and Z is an alkyl group having not to exceed 3 carbon atoms.

4. A di-substituted malonic ester represented by the following formula:

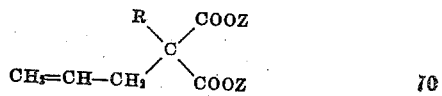

in which R is a saturated secondary-aliphatic radical having a number of carbon atoms between 5 and 7 inclusive, and Z is an alkyl group having not to exceed 3 carbon atoms.

5. A di-substituted malonic ester represented by the following formula:

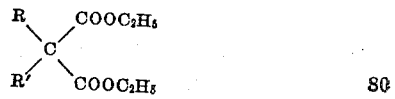

in which R is a saturated secondary-aliphatic radical having a number of carbon atoms between 5 and 7 inclusive, and R' is a straight-chain aliphatic radical having 5 hydrogen atoms and no triple bonds.

6. A di-substituted malonic ester represented by the following formula:

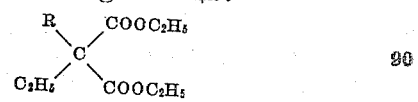

in which R is a saturated secondary-aliphatic radical having a number of carbon atoms between 5 and 7 inclusive.

7. A di-substituted malonic ester represented by the following formula:

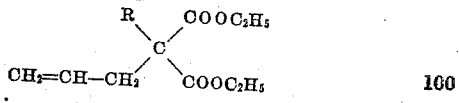

in which R is a saturated secondary-aliphatic radical having a number of carbon atoms between 5 and 7 inclusive.

8. A di-substituted malonic ester represented by the following formula:

in which R is a secondary-amyl group, R' is a straight-chain aliphatic radical having 5 hydrogen atoms and no triple bonds, and Z is an alkyl group having not to exceed 3 carbon atoms.

9. A di-substituted malonic ester represented by the following formula:

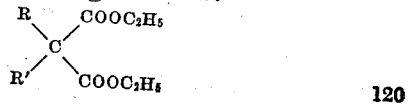

in which R is a secondary-amyl group, and R' is a straight-chain aliphatic radical having 5 hydrogen atoms and no triple bonds.

10. A di-substituted malonic ester represented by the following formula:

in which R is a secondary-amyl group, and Z is an alkyl group having not to exceed 3 carbon atoms.

11. A di-substituted malonic ester represented by the following formula:

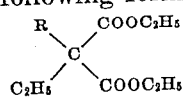

in which R is a secondary-amyl group.

12. A di-substituted malonic ester represented by the following formula:

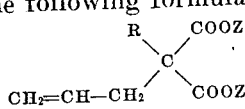

in which R is a secondary-amyl group, and Z is an alkyl group having not to exceed 3 carbon atoms.

13. A di-substituted malonic ester represented by the following formula:

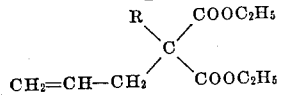

in which R is a secondary-amyl group.

14. A di-substituted malonic ester represented by the following formula:

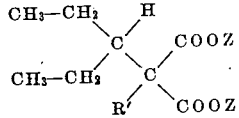

in which R' is a straight-chain aliphatic radical having 5 hydrogen atoms and no triple bonds, and Z is an alkyl group having not to exceed 3 carbon atoms.

15. A di-substituted malonic ester represented by the following formula:

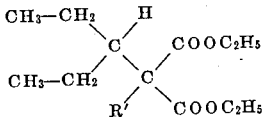

in which R' is a straight-chain aliphatic radical having 5 hydrogen atoms and no triple bonds.

16. A di-substituted malonic ester represented by the following formula:

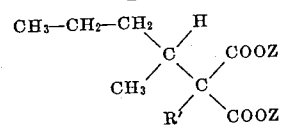

in which R' is a straight-chain aliphatic radical having 5 hydrogen atoms and no triple bonds, and Z is an alkyl group having not to exceed 3 carbon atoms.

17. A di-substituted malonic ester represented by the following formula:

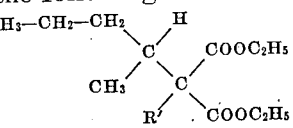

in which R' is a straight-chain aliphatic radical having 5 hydrogen atoms and no triple bonds.

18. A di-substituted malonic ester represented by the following formula:

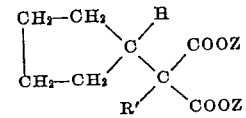

in which R' is a straight-chain aliphatic radical having 5 hydrogen atoms and no triple bonds, and Z is an alkyl group having not to exceed 3 carbon atoms.

19. A di-substituted malonic ester represented by the following formula:

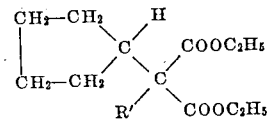

in which R' is a straight-chain aliphatic radical having 5 hydrogen atoms and no triple bonds.

20. A di-substituted malonic ester represented by the following formula:

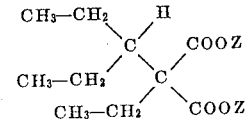

in which Z is an alkyl group having not to exceed 3 carbon atoms.

21. Di-ethyl-carbinyl ethyl ethyl-malonate, represented by the following formula:

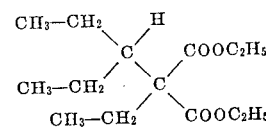

22. A di-substituted malonic ester represented by the following formula:

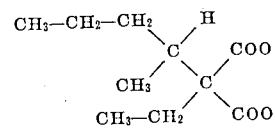

in which Z is an alkyl group having not to exceed 3 carbon atoms.

23. n-propl-methyl-carbinyl ethyl ethylmalonate, represented by the following formula.

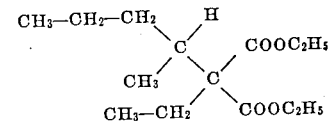

24. A di-substituted malonic ester represented by the following formula:

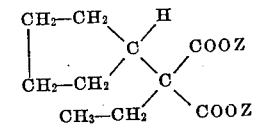

in which Z is an alkyl group having not to exceed 3 carbon atoms.

25. Cyclo-pentyl ethyl ethyl-malonate, represented by the following formula:
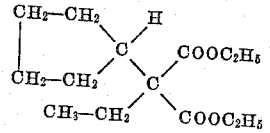
In witness whereof, I have hereunto set my hand at Indianapolis, Indiana, this 21st day of April, A. D. one thousand nine hundred and thirty-one.
HORACE A. SHONLE.